Figure 1:
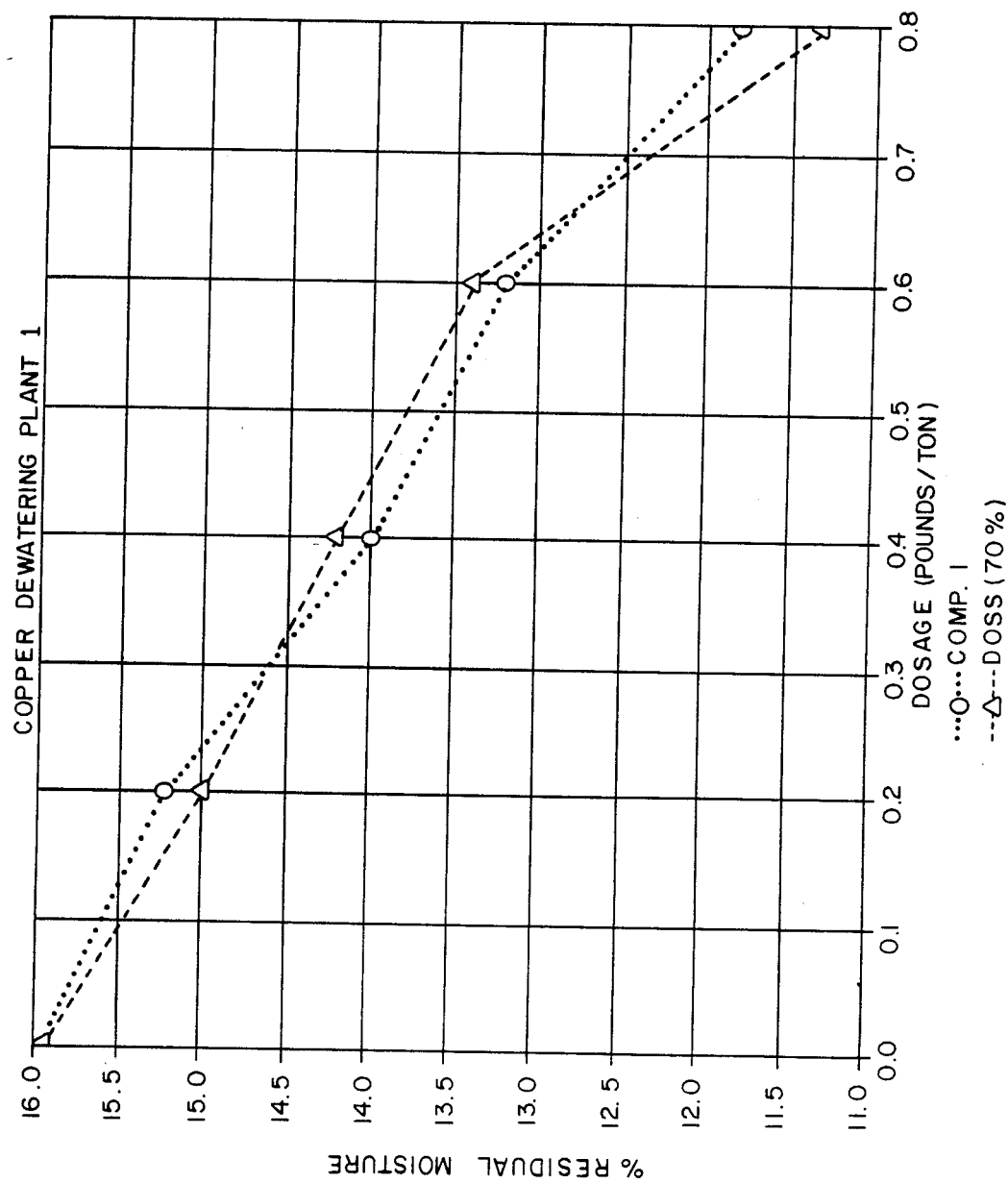

United States Patent [19]

Roe et al.

[11] Patent Number: 4,568,475

[45] Date of Patent: Feb. 4, 1986

[54] DEWATERING AGENT COMPOSITIONS FOR SULFIDE MATERIALS

[75] Inventors: William J. Roe, Aurora; Jacqueline L. Perisho, Oak Park, both of Ill.

[73] Assignee: Nalco Chemical Company, Oak Brook, Ill.

[21] Appl. No.: 693,394

[22] Filed: Jan. 22, 1985

Related U.S. Application Data

[62] Division of Ser. No. 608,844, May 10, 1984, Pat. No. 4,532,049.

[51] Int. Cl.$^4$ .............................................. C09K 3/00
[52] U.S. Cl. .................................... 252/60; 209/5; 210/728; 210/778; 210/907; 252/73; 252/194; 252/558
[58] Field of Search ............... 252/60, 73, 194, 558; 210/728, 778, 907; 209/5

[56] References Cited

U.S. PATENT DOCUMENTS

| | | | |
|---|---|---|---|
| 2,266,954 | 12/1941 | Bonnet et al. | 210/731 |
| 3,174,935 | 3/1965 | Eccles, Jr. et al. | 252/558 |
| 4,153,549 | 5/1979 | Wang et al. | 210/729 |
| 4,172,029 | 10/1979 | Hefner, Jr. | 209/166 |
| 4,249,699 | 2/1981 | Smith et al. | 241/20 |

*Primary Examiner*—Paul Lieberman
*Assistant Examiner*—Robert A. Wax
*Attorney, Agent, or Firm*—John G. Premo; Donald G. Epple

[57] ABSTRACT

An improved dewatering agent for aqueous slurries of mineral concentrates comprising branched dodecylbenzene sulphonic acid used alone or in combination with sodium xylene sulphonate.

2 Claims, 5 Drawing Figures

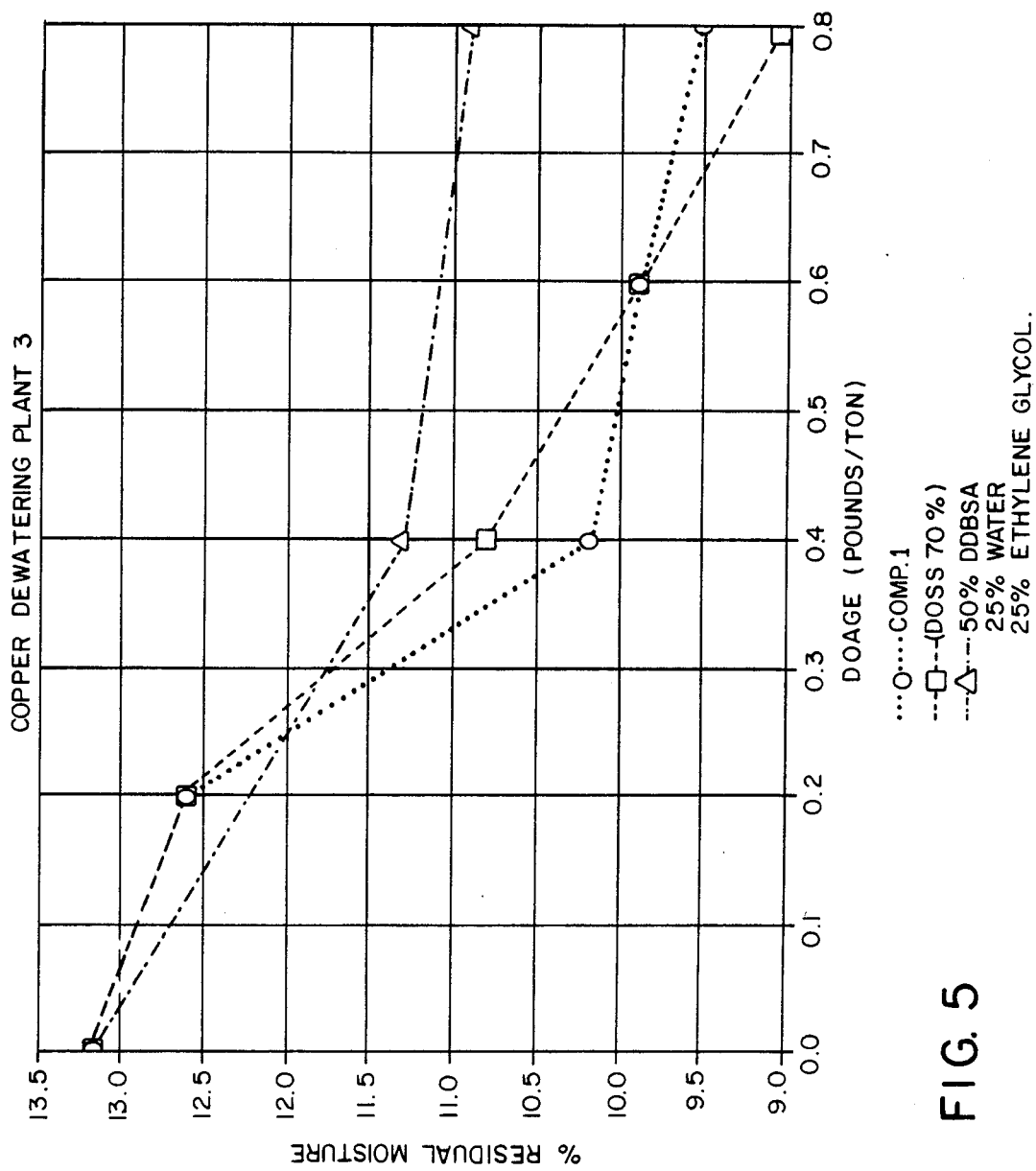

DEWATERING AGENT COMPOSITIONS FOR SULFIDE MATERIALS

This application is a division, of application Ser. No. 608,844, filed May 10, 1984, now U.S. Pat. No. 4,532,049.

This invention relates to an improved process for dewatering a mineral concentrate.

Ores of various minerals are concentrated by various procedures to provide mineral concentrates that are further processed to valuable materials. One of the most widely used methods of concentration of minerals is that of froth flotation which is applicable to a wide variety of ores including sulfide and non-sulfide varieties. In many instances a series of flotations are performed whereby increasingly cleaner concentrates result. After a concentrate has been sufficiently enriched in mineral values, it may be subjected to further processing such as drying and smelting, which processing may be performed at another location. To subject the concentrate to further processing, it is generally dewatered by filtration or equivalent process such as centrifugation to remove water therefrom. The removal of water from the concentrate decreases the costs of shipping when it is processed at a new location. The removal of water also reduces the requirements for energy consumption when drying is effected.

The commercial procedure for dewatering mineral concentrates generally involved filtration of the aqueous slurry of mineral values arising from concentrating the ore by flotation or other concentration process. The residual water content of the dewatered mineral concentrate will vary widely depending upon the mineral composition, the procedure of dewatering employed, the absence or presence of dewatering aid, and the like.

Certain dewatering aids have been used in the prior process for dewatering. In some instances, the dewatering aid was not completely acceptable because it did not reduce the moisture content of the dewatered mineral concentrate adequately. In other instances, the dewatering aid was not substantially adsorbed on the dewatered mineral concentrate and contaminated the process water, which water is recycled to the mining processes, including that of ore concentration, from where the mineral concentrates to be dewatered arise. Contamination of the recycled process water adversely affects ore concentration and other processes associated with mining operation.

Commonly used dewatering agents for dewatering mineral concentrates are the sodium dialkyl sulfosuccinates described in U.S. Pat. No. 4,153,549. A commercial species of the sodium dialkyl sulfosuccinates is sodium dioctyl sulfosuccinate, commonly referred to in the trade and hereafter as DOSS.

While effective in copper concentrate and lead filtration applications, concentrated DOSS-containing products suffer from severe handling problems caused by "skinning" of the products at air/liquid interfaces. This problem forces DOSS-based products to be sold only in drum quantities (never in bulk), thus causing wastage.

In addition to the disadvantages described above, DOSS is an expensive chemical. If it were possible to provide a dewatering agent as effective as DOSS yet which was less expensive and more readily available, an advance in the art of mineral processing would be afforded.

THE INVENTION

The invention comprises a process for reducing the moisture content of mineral concentrates subject to dewatering which comprises mixing with an aqueous slurry of said mineral concentrates an effective amount of a branched dodecyl benzene sulphonic acid (hereafter referred to as DDBSA).

This material may be further enhanced in its activity yet, at the same time, provide a lower cost product by combining it with sodium xylene sulphonate. When combined with the sodium xylene sulphonate, It is preferred to use DDBSA to sodium xylene sulphonate in a weight ratio of 5:1 with a general ratio of DDBSA to sodium xylene sulphonate being within the range of 5:1 to 3:1.

When DDBSA, either alone or in combination with sodium xylene sulphonate, is transported and stored commercially, it is beneficial that there be incorporated therewith a stabilizing agent comprising a water-soluble alcohol. Preferred stabilizing agents are water-soluble polyhydric alcohols with a most preferred alcohol being ethylene glycol. The amount used to stabilize DDBSA or DDBSA in combination with sodium xylene sulphonate, will range between 10–50% by weight.

A typical composition used in the practice of the invention is Composition 1 which is set forth below:

| Composition 1 | |
|---|---|
| Ingredients | % by weight |
| $C_{12}$, dodecyl benzene sulfonic acid | 50.0 |
| Sodium xylene sulfonate | 10.0 |
| Ethylene glycol | 25.0 |
| Tap Water | 15.0 |

The compositions of the invention are capable of dewatering a wide variety of mineral concentrates although they are most effective in dewatering sulfided minerals, particularly copper, lead, and zinc concentrates. They are also useful in dewatering fine phosphate rock. The compositions of the invention may also be used in dewatering coal slurries.

The dosage of the compositions which are effective to provide dewatering of various mineral slurries will, of course, vary upon the particular slurry being dewatered. For purposes of illustration, copper dewatering can be achieved by using between about 0.3–1 lb./ton of Composition 1. In the case of fine phosphate rock dewatering, good effects can be achieved at dosages ranging between 0.1–0.5 lbs./ton.

EXAMPLES

To illustrate the advantages of the invention, the following are presented by way of example. The following experimental procedure was used:

A large copper concentrate sample was split into individual 260 ml samples. This was done by adding small volumes to consecutive 400 ml disposable beakers in a "back and forth" fashion, thereby compensating for bucket classification. The copper slurry used was measured at 61% solids.

Product solutions were added directly to the sample beakers as 10% solutions. The slurries were conditioned with a cone-drive mixer/paddle assembly for 30 seconds following product addition.

The conditioned samples were poured into a filter leaf assembly fitted with the appropriate cloth and a 1.5" plastic collar. Charging of the leaf assembly was done with the applied vacuum valved off just below the leaf head.

The initial vacuum as adjusted to match the plant vacuum of 22" Hg. Upon engaging the vacuum, a stopwatch was started in order to measure form time. (The form time varied between 45 and 55 seconds, independent of treatment.) Upon reaching a form, a second watch as started, and a 2.5 minute vacuum dry time allowed.

The moist cakes were immediately discharged into aluminum pans, the wet weights recorded, and the pans placed in a drying oven. Upon drying overnight, the dry weights were recorded and the moistures calculated.

EXAMPLE 1

Figure 2:
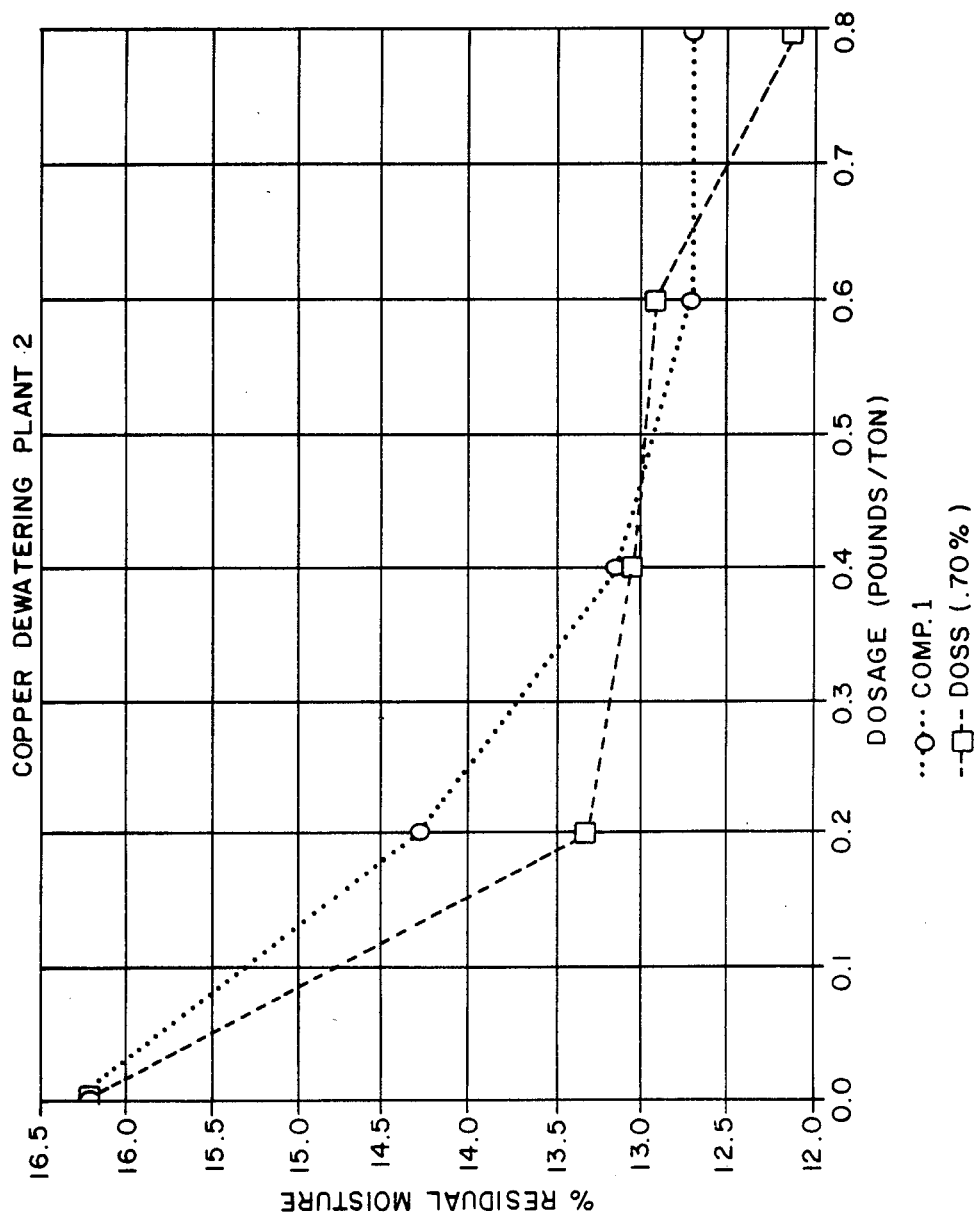
Figure 3:
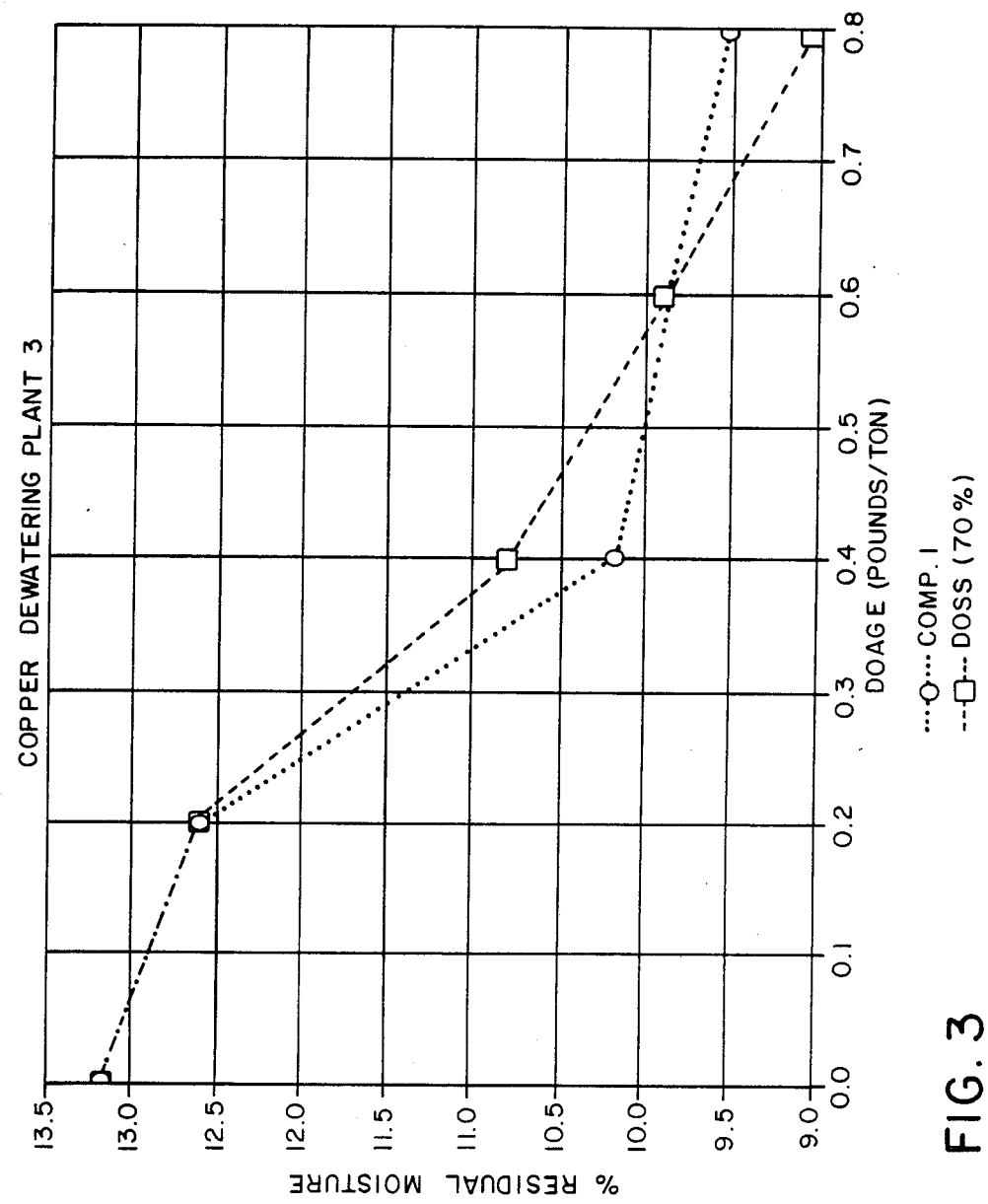

Using the above experimental technique, three different copper slurries were tested. These slurries were samples received from three different commercial copper mining installations. The results of these studies are shown in FIGS. 1, 2, and 3. Composition 1 was compared against a 70% isopropanol solution of DOSS.

From the FIGS., it is evident that at 0.6 lb./ton, Composition 1 is more effective than DOSS.

EXAMPLE 2

The test conditions used corresponded to those used commercially in a phosphate mining operation from which the phosphate rock sample was taken. The test parameters are set forth below:

| Cake thickness | 1¾" |
| Filtration time | 1 minute |
| Initial applied vacuum | 12" Hg |
| % H$_2$O in untreated | 13–16% |

-continued

| filter cake: |
|---|

In this comparative test, Composition 1 as compared against a 40% DOSS in an aqueous solution which also contained a branched octyl alcohol.

Figure 4:
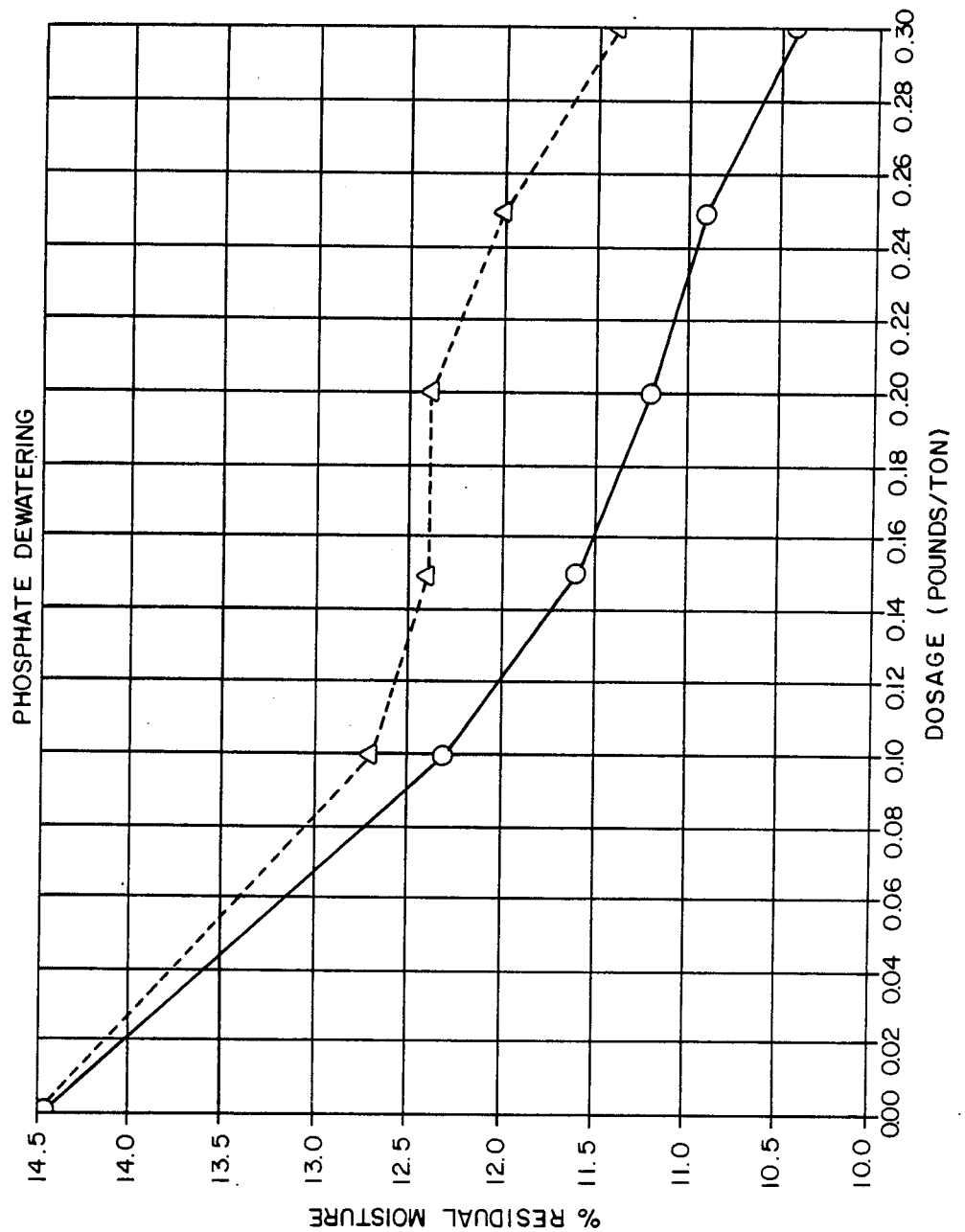

The results showing the superiority of Composition 1 v. Doss are set forth in FIG. 4. Further studies show that products such as Composition 1 are stable under conditions of use and long-term storage are not subject to the problems encountered when concentrated, expensive DOSS solutions are used.

FIG. 5 shows the advantages of using sodium xylene sulphonate to improve the activity of DDBSA. This comparative study used the test procedure of Example 1 and the copper slurry of FIG. 3.

It is understood that the compositions used in the invention may be slightly varied without departing from the scope as described herein. For example, any water-soluble salt of DDBSA or xylene sulphonate may be used. Similarly, related branched chained alkyl groups may be substituted for the $C_{12}$ branched chained alkyl group of DDBSA.

Having thus described our invention, it is claimed:

1. A composition useful in dewatering mineral slurries comprising:

| Ingredients | % by weight |
|---|---|
| $C_{12}$, dodecyl benzene sulfonic acid | 50.0 |
| Sodium xylene sulfonate | 10.0 |
| Ethylene glycol | 25.0 |
| Tap Water | 15.0. |

2. A composition useful in dewatering mineral slurries comprising branched dodecyl benzene sulphonic acid and sodium xylene sulphonate in a weight ratio of 5:1 to 3:1 and a stabilizing amount of ethylene glycol.

* * * * *